United States Patent
Garza et al.

(10) Patent No.: US 11,336,222 B1
(45) Date of Patent: May 17, 2022

(54) UNIVERSAL CLAMP ASSEMBLY

(71) Applicants: David G. Garza, Plano, TX (US); Horacio Duhart, Plano, TX (US)

(72) Inventors: David G. Garza, Plano, TX (US); Horacio Duhart, Plano, TX (US)

( * ) Notice: Subject to any disclaimer, the term of this patent is extended or adjusted under 35 U.S.C. 154(b) by 0 days.

(21) Appl. No.: 17/522,787

(22) Filed: Nov. 9, 2021

Related U.S. Application Data

(60) Provisional application No. 63/256,526, filed on Oct. 15, 2021.

(51) Int. Cl.
*H02S 30/00* (2014.01)
*F16B 5/06* (2006.01)

(52) U.S. Cl.
CPC ............ *H02S 30/00* (2013.01); *F16B 5/0621* (2013.01)

(58) Field of Classification Search
CPC .......... F16B 5/0621; F16B 2/065; F16B 2/12; F16B 5/0635; F16B 5/0685; H02S 30/00; H02S 30/10; F24S 25/60; F24S 25/636; Y02E 10/47
See application file for complete search history.

(56) References Cited

U.S. PATENT DOCUMENTS

| | | | | |
|---|---|---|---|---|
| 6,672,018 B2 * | 1/2004 | Shingleton | ............... | H02S 20/23 52/173.3 |
| 8,181,926 B2 * | 5/2012 | Magno, Jr | ............ | F24S 25/636 248/237 |
| 9,097,443 B2 * | 8/2015 | Liu | ........................... | F24S 25/33 |
| 9,803,893 B2 * | 10/2017 | Giraudo | ................... | H02S 20/20 |
| 9,813,013 B2 * | 11/2017 | McPheeters | ............. | H02S 30/10 |
| 9,853,593 B2 * | 12/2017 | Cinnamon | ............ | F24S 25/632 |
| 10,205,419 B2 * | 2/2019 | McPheeters | ............ | H02S 20/30 |
| 10,298,170 B2 * | 5/2019 | Molina | ..................... | H02S 20/23 |
| 10,340,837 B2 * | 7/2019 | Wildes | ..................... | F24S 25/61 |
| 10,381,500 B2 * | 8/2019 | Rubio | ..................... | H02S 40/425 |
| 10,469,022 B2 * | 11/2019 | Kovacs | ..................... | H02S 20/23 |
| 10,749,459 B1 * | 8/2020 | Liu | ......................... | F24S 25/636 |
| 10,797,634 B1 * | 10/2020 | Jasmin | ..................... | H02S 20/23 |
| 10,819,271 B2 * | 10/2020 | Schuit | ...................... | H02S 20/23 |
| 10,897,223 B2 * | 1/2021 | Stearns | .................. | F24S 25/636 |

(Continued)

FOREIGN PATENT DOCUMENTS

| | | | | |
|---|---|---|---|---|
| CN | 108306609 A | * | 7/2018 | ............. H02S 30/00 |
| KR | 20170122316 A | * | 11/2017 | ............. F24S 25/636 |

*Primary Examiner* — Matthew R McMahon
(74) *Attorney, Agent, or Firm* — Thrasher Associates

(57) ABSTRACT

Embodiments herein disclose a universal clamp assembly for clamping a solar panel. The universal clamp assembly comprises a securing means to secure a support structure, the support structure configured to couple with a rail of the solar panel and a shock absorbing member disposed between the securing means and the support structure to keep the securing means in place during installation. The securing means comprises a first channel, a second channel, a first securing hole, at least one first hole, at least one first pin, a protruding structure and a grooved wall. The support structure comprises a second securing hole to secure a securing member disposed through the first securing hole of the securing means, thereby joining the securing means and the support structure, a first lateral wall, a second lateral wall, a first coupling member and a second coupling member to secure the universal clamp assembly in the rail.

16 Claims, 5 Drawing Sheets

(56) References Cited

U.S. PATENT DOCUMENTS

| | | | |
|---|---|---|---|
| 10,903,785 B2* | 1/2021 | Haddock | H02S 20/23 |
| 11,221,034 B1* | 1/2022 | Katz | F24S 25/636 |
| 2011/0039430 A1* | 2/2011 | Aftanas | H02S 20/23 |
| | | | 439/92 |
| 2020/0313604 A1* | 10/2020 | Harris | H02S 20/23 |

* cited by examiner

UNIVERSAL CLAMP ASSEMBLY

CLAIM OF PRIORITY, IDENTIFICATION OF RELATED APPLICATIONS

This Non-Provisional patent application claims priority from U.S. Provisional Patent Application No. 63/256,526 filed on Oct. 15, 2021 entitled SOLAR PANEL RAIL-AND-CLAMP SYSTEM, to common inventors David G. Garza, et al.

TECHNICAL FIELD

The present invention generally relates to clamp assembly. More specifically, the present invention relates to a clamp assembly for clamping solar panels.

PROBLEM STATEMENT AND HISTORY

Interpretation Considerations

This section describes technical field in detail and discusses problems encountered in the technical field. Therefore, statements in the section are not to be construed as prior art.

Discussion of History of the Problem

Solar energy has become increasingly attractive as renewable and sustainable energy source for electricity generation. One can install solar panels on surfaces such as roofs for exposure to sunlight for generating direct current electricity. However, the use of solar power/electric technology has been limited by installation cost of solar panels. Apart from the cost factor, the installation of solar panels can be time-consuming and onerous as a variety of clamping elements are required due to varying sizes of the solar panels as well as rail configurations. Also, sometimes drilling of components may be required. This makes the installation process even more cumbersome.

As a result, it is desirable to have a clamp assembly that can reduce the installation cost and can easily secure different types of solar panels to different types of rails without drilling components during installation. The present invention provides such solutions.

SUMMARY

The present invention relates to a universal clamp assembly for clamping a solar panel. The universal clamp assembly comprises a securing means to secure a support structure, the support structure configured to couple with a rail of the solar panel and a shock absorbing member disposed between the securing means and the support structure to keep the securing means in place during installation.

The securing means is coupled with a frame of the solar panel. The securing means comprises a first channel on a top surface of the securing means, a second channel on the top surface across a longitudinal axis from a first end to a second end of the securing means, a first securing hole to secure a securing member, at least one first hole at a bottom surface of the securing means that receives at least one first pin adapted to avoid anodizing of a frame of the solar panel, a protruding structure at the bottom surface of the securing means to prevent rotation of the securing means while tightening the securing member and a grooved wall extending from the bottom surface to place the securing means with the support structure in a position to prevent sliding.

The support structure comprises a second securing hole to secure the securing member disposed through the first securing hole of the securing means, thereby joining the securing means and the support structure, a first lateral wall and a second lateral wall to provide suitable positioning to the securing means on the support structure and a first coupling member and a second coupling member to secure the universal clamp assembly in the rail. The first lateral wall and the second lateral wall have a first ribbed surface and a second ribbed surface respectively for suitable positioning of the securing means on the support structure. The first coupling member and the second coupling member comprise at least one notch adapted to avoid anodizing on the rail that supports the solar panel.

The support structure further comprises a first stabilizing element and a second stabilizing element opposite to each other to stabilize the securing member when having contact with the first stabilizing element and the second stabilizing element.

Of course, the present is simply a Summary, and not a complete description of the invention.

BRIEF DESCRIPTION OF THE DRAWINGS

Various aspects of the invention and its embodiment are better understood by referring to the following detailed description. To understand the invention, the detailed description should be read in conjunction with the drawings.

Figure 1:
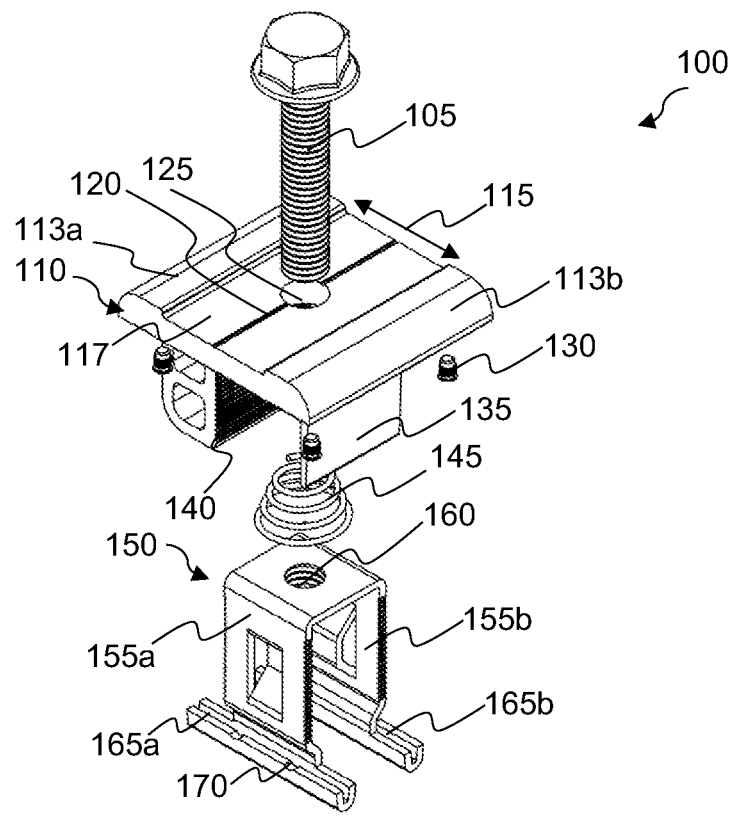
FIG. 1 illustrates an exploded view of a universal clamp assembly.

DESCRIPTION OF AN EXEMPLARY PREFERRED EMBODIMENT
INTERPRETATION CONSIDERATIONS

While reading this section (Description of An Exemplary Preferred Embodiment, which describes the exemplary embodiment of the best mode of the invention, hereinafter referred to as "exemplary embodiment"), one should consider the exemplary embodiment as the best mode for practicing the invention during filing of the patent in accordance with the inventor's belief. As a person with ordinary skills in the art may recognize substantially equivalent structures or substantially equivalent acts to achieve the same results in the same manner, or in a dissimilar manner, the exemplary embodiment should not be interpreted as limiting the invention to one embodiment.

The discussion of a species (or a specific item) invokes the genus (the class of items) to which the species belongs as well as related species in this genus. Similarly, the recitation of a genus invokes the species known in the art. Further-more, as technology develops, numerous additional alternatives to achieve an aspect of the invention may arise. Such advances are incorporated within their respective genus and should be recognized as being functionally equivalent or structurally equivalent to the aspect shown or described.

A function or an act should be interpreted as incorporating all modes of performing the function or act, unless otherwise explicitly stated. For instance, sheet drying may be performed through dry or wet heat application, or by using microwaves. Therefore, the use of the word "paper drying" invokes "dry heating" or "wet heating" and all other modes of this word and similar words such as "pressure heating".

Unless explicitly stated otherwise, conjunctive words (such as "or", "and", "including", or "comprising") should be interpreted in the inclusive and not the exclusive sense.

As will be understood by those of the ordinary skill in the art, various structures and devices are depicted in the block diagram to not obscure the invention. In the following discussion, acts with similar names are performed in similar manners, unless otherwise stated.

The foregoing discussions and definitions are provided for clarification purposes and are not limiting. Words and phrases are to be accorded their ordinary, plain meaning, unless indicated otherwise.

DESCRIPTION OF THE DRAWINGS, A PREFERRED EMBODIMENT

The systems, methods, and devices described herein can offer, among other advantages, decreased cost of installing solar panel arrays or components thereof. For example, the systems, methods, and devices can be installed without drilling components during installation. Also, the modular nature of the assemblies enabled by the present invention allow for easier installation and breakdown (disassembly) of solar panel installations.

Advantageously, the universal clamp assembly works as a mid-clamp or as an end-clamp without the need to add accessories. It performs both functions by making a 90° turn of the upper part (i.e., the securing means discussed below). This upper part is prepared to break anodizing of solar panel frames in either end-clamp mode or mid-clamp mode.

Preferably, the universal clamp assembly 100 has a grooved area (discussed in detail below) that makes contact with a solar panel. The grooves increase the friction between a solar panel frame and the universal clamp assembly. The universal clamp assembly additionally features notches that break rail anodizing and ensures conductivity between the solar panels and the rail.

Figure 2:
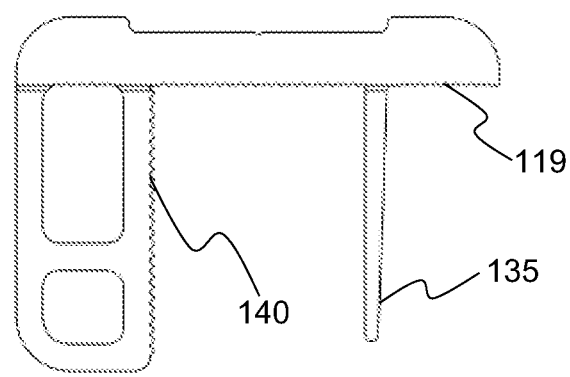
FIG. 2 is a side view of a securing means of the universal clamp assembly.
Figure 3:
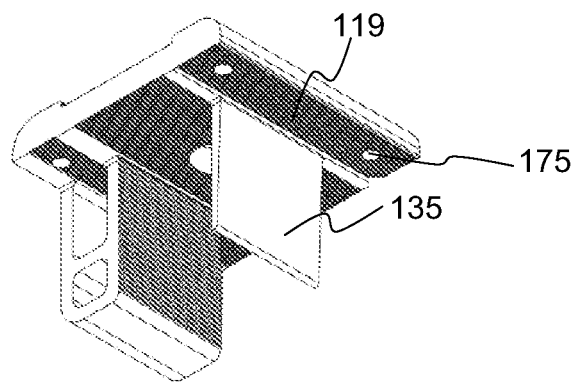
FIG. 3 shows an isometric view of the securing means.
Figure 4:
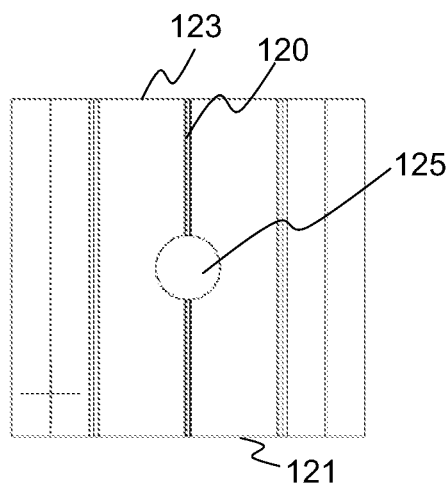
FIG. 4 is a top view of the universal clamp assembly.
Figure 5:
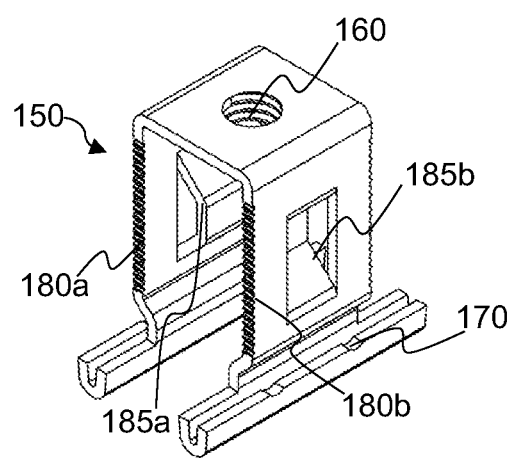
FIG. 5 is a perspective view of a support structure of the universal clamp assembly.
Figure 6:
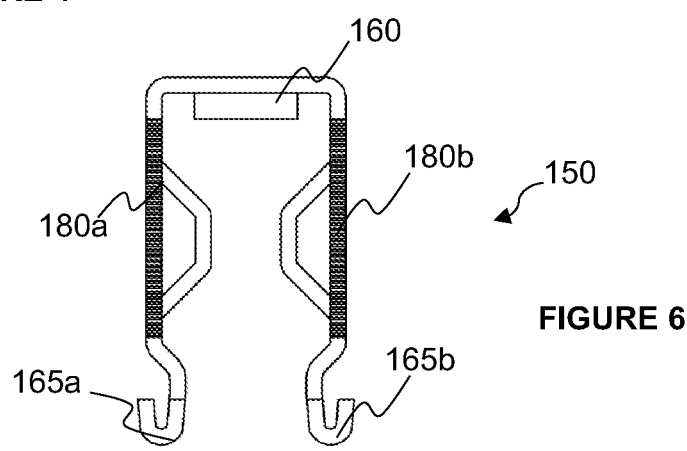
FIG. 6 is a side view of the support structure.
Figure 7:
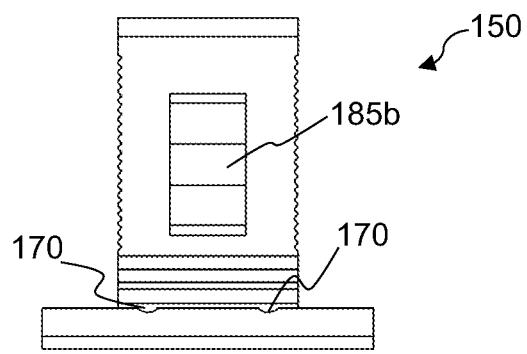
FIG. 7 is a front view of the support structure.

The following discussion makes simultaneous reference to FIGS. 1 through 7, in which FIG. 1 illustrates an exploded view of a universal clamp assembly, FIG. 2 illustrates a side view of a securing means of the universal clamp assembly, FIG. 3 shows an isometric view of the securing means, FIG. 4 is a top view of the universal clamp assembly, FIG. 5 is a perspective view of a support structure of the universal clamp assembly, FIG. 6 is a side view of the support structure, and FIG. 7 is a front view of the support structure.

The universal clamp assembly 100 is generally a two-part modular assembly that comprises a securing means 110, a shock absorbing member 145 and a support structure 150.

The securing means 110 forms an upper part of the universal clamp assembly and is preferably made of a metal, such as steel, aluminum, for example. The securing means 110 secures the support structure 150 and is coupled with a frame 410 of solar panels 420 (shown in FIG. 10). The securing means is defined by a top surface 117, a bottom surface 119, a first end 121 and a second end 123. Likewise, the securing means has a first edge 113a and a second edge 113b, each beveled from top to bottom.

The securing means comprises a first channel 115, a second channel 120, a first securing hole 125, at least one first pin 130, a protruding structure 135, a grooved wall 140 and at least one first hole 175.

The first channel 115 is a broad channel formed on the top surface 117. The second channel 120 is a narrow V-groove inside the first channel 115 on the top surface across a longitudinal axis from the first end 121 to the second end 123 of the securing means. The second channel 120 indicates the position where the first securing hole 125 will be made through which a securing member 105 will be inserted. The first securing hole 125 is configured to secure the securing member 105 that allows coupling of the securing means 110 to the support structure 150. The securing member 105 may be at least one of a bolt, flanged bolt, threaded drive bolt, rivet, for example.

Figure 10:
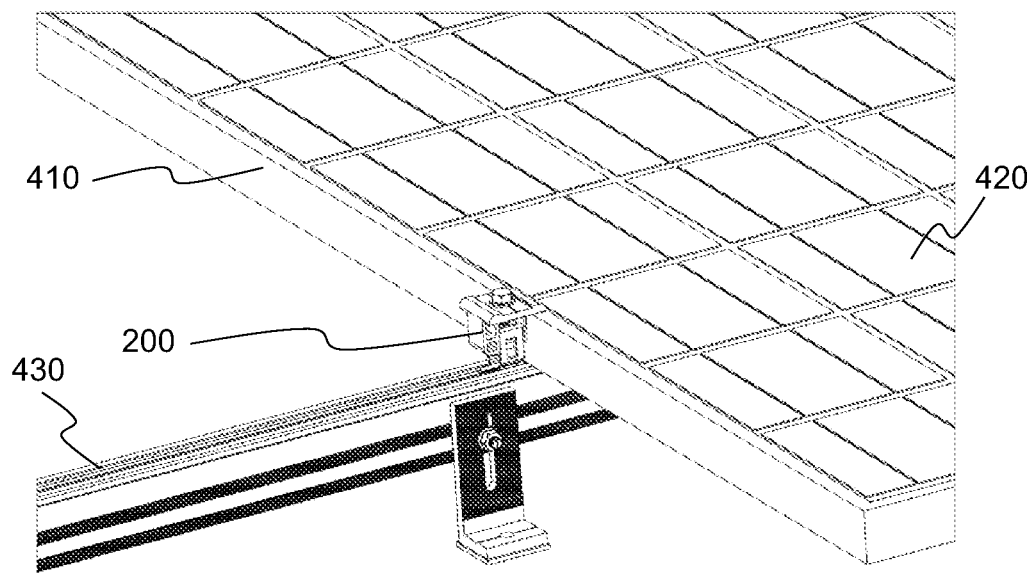
FIG. 10 to FIG. 13 illustrate mountings of solar panels using the universal clamp assembly.

At the bottom surface 119 of the securing means 110, the at least one first hole 175 is located that receives the at least one first pin 130 adapted to avoid anodizing of the frame 410 of the solar panels (shown in FIG. 10). In other words, the at least one first pin 130 has the function of breaking the anodizing that the frame of the solar panels to ensure the connection between solar panels. In an example, there may be, but not limited to, four first pins 130 and four first holes 175 configured. Other variations are also possible. The at least one first pin 130 may be made of at least one of aluminum and non-ferrous element, for example.

The protruding structure 135 at the bottom surface 119 of the securing means 110 is adapted to prevent the rotation of the securing means while tightening the securing member 105. The grooved wall 140 extending from the bottom surface 119 is configured to place the securing means 110 with the support structure 150 in a position to prevent sliding. The grooved wall 140 increases friction between the frame and the universal clamp assembly 100.

The support structure 150 couples with a rail 430 of the solar panels 420 (shown in FIG. 10). The support structure is made of a metal, such as steel, aluminum, for example. The support structure comprises a second securing hole 160, a first lateral wall 155a, a second lateral wall 155b, a first coupling member 165a, a second coupling member 165b, a first stabilizing element 185a and a second stabilizing element 185b.

The second securing hole 160 secures the securing member 105 disposed through the first securing hole 125 of the securing means 110, thereby joining the securing means 110 and the support structure 150.

The first lateral wall 155a and the second lateral wall 155b provide suitable positioning to the securing means 110 on the support structure 150. The first lateral wall 155a and the second lateral wall 155b have a first ribbed surface 180a and a second ribbed surface 180b respectively for suitable positioning of the securing means 110 on the support structure 150. The first ribbed surface 180a and the second ribbed surface 180b increase friction between the rail and the universal clamp assembly.

The first coupling member 165a and the second coupling member 165b secure the universal clamp assembly in the rail 430 (shown in FIG. 10). The first coupling member 165a and the second coupling member 165b are U-shaped, for example. The first coupling member 165a and the second coupling member 165b make contact with the rail or element where the universal clamp assembly 100 will be fixed and anchors the universal clamp assembly to the rail or element where the universal clamp assembly will be fixed. The first coupling member 165a and the second coupling member 165b comprise at least one notch 170 adapted to avoid anodizing on the rail 430 that supports the solar panels 420 and ensuring conductivity between the solar panels and the rail. That is, the at least one notch 170 has the function of avoiding anodizing on the rail or element where the support structure will be fixed when tightened to ensure electrical conductivity from the frames of the solar panels to the rails. In an embodiment, each of the first coupling member 165a and the second coupling member 165b may have two notches respectively. In another embodiment, there may be suitable number of notches.

The shock absorbing member 145 is disposed between the securing means 110 and the support structure 150 to keep the securing means in place during installation. Additionally, the shock absorbing member 145 has a shock absorbing effect and provides a freedom of movement to the universal clamp assembly as well as the solar panels. The shock absorbing member allows movement of the universal clamp assembly as well as the solar panels in case of sudden shocks such as earthquake, vibration, for example without separating the components.

The first stabilizing element 185a and the second stabilizing element 185b are located opposite to each other to stabilize the securing member 105 when having contact with the first stabilizing element 185a and the second stabilizing element 185b. The first stabilizing element and the second stabilizing element are coupled with the first lateral wall and the second lateral wall respectively. The first stabilizing element 185a and the second stabilizing element 185b are trapezoidal shaped. Other suitable shapes are also possible that efficiently stabilize the securing member 105.

Figure 8:
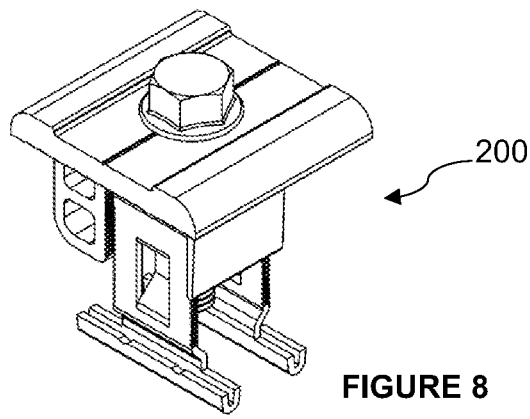
FIG. 8 illustrates the universal clamp assembly in an end-clamp mode.
Figure 9:
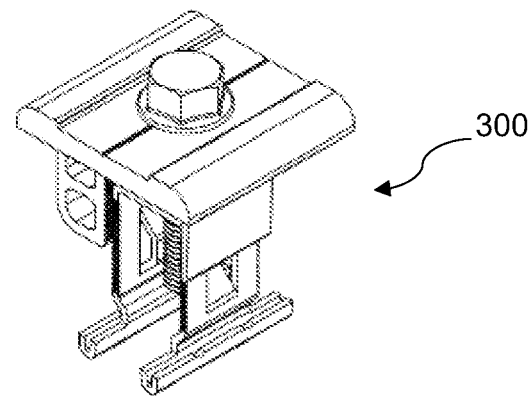
FIG. 9 illustrates the universal clamp assembly in a mid-clamp mode.

Now, simultaneous reference is made to FIGS. 8 and 9, which are provided to create additional inventive understanding. FIG. 8 illustrates the universal clamp assembly 100 in an end-clamp mode 200. In contrast, FIG. 9 illustrates the universal clamp assembly 100 in a mid-clamp mode 300. The universal clamp assembly 100 has the innovation of being able to be used as the mid-clamp 300 or as the end-clamp 200 with a simple turn of 90 degrees to the securing means 110 without the need to add accessories.

Figure 11:
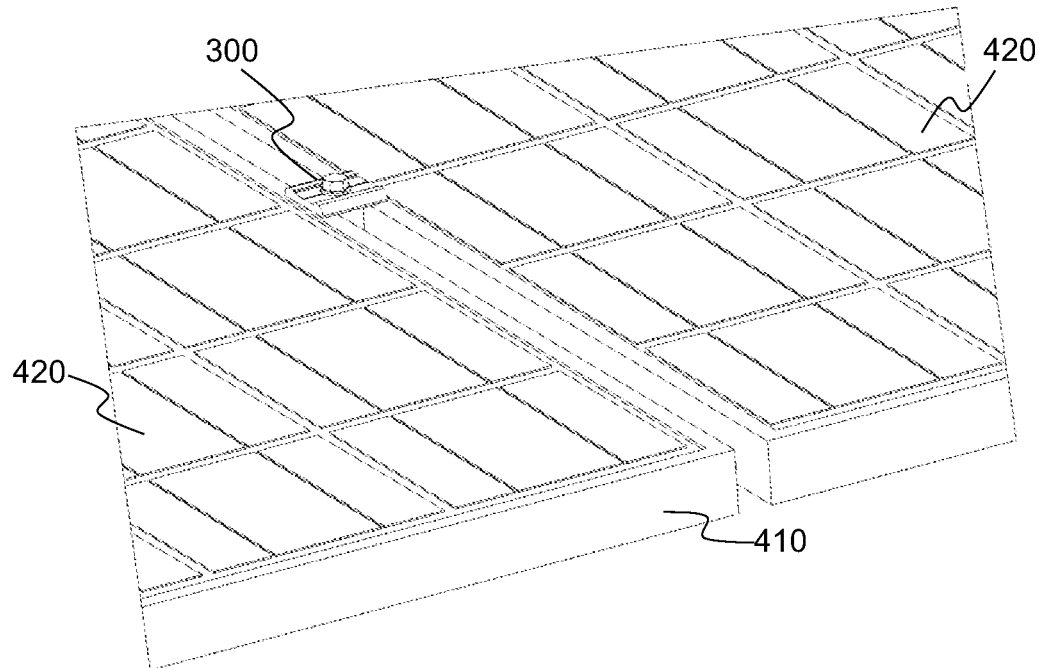

Now turning to practical applications, FIGS. 10 to 13 illustrate mounting of the solar panels 420 using the universal clamp assembly 100. In FIG. 10, the solar panels 420 are mounted on the rail 430 using the universal clamp assembly in the end-clamp mode 200 that holds the solar panels 420 from the frame 410 and at the bottom to the rail 430. FIG. 11 shows the solar panels 420 and in the center, the universal clamp assembly 100 in mid-clamp mode 300 is holding the solar panels 420.

Figure 12:
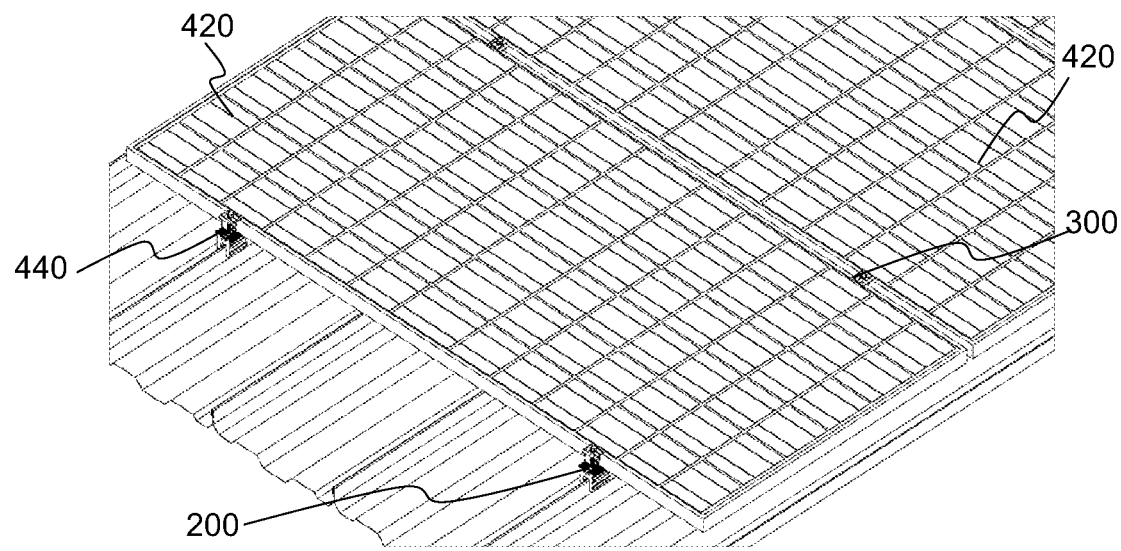

FIG. 12 shows a part of the solar panels 420 on an anchored standing seam with a seam clamp 440, where the universal clamp assembly 100 in the end-clamp mode 200 holds the solar panels 420 from the frame 410 and at the bottom to the seam clamp 440 as well as in the center, the universal clamp assembly 100 in the mid-clamp mode 300 holds the solar panels 420.

Figure 13:
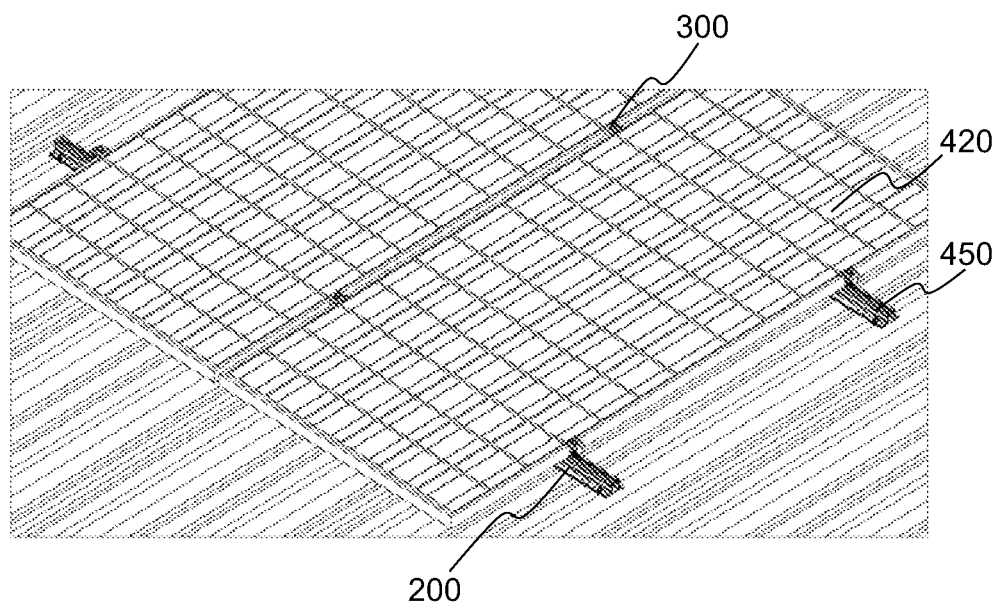

Referring to FIG. 13, a part of the solar panels 420 on a trapezoidal sheet anchored with a rail for a trapezoidal metal roof 450 is shown, where the universal clamp assembly in the end-clamp mode 200 holds the solar panels 420 from the frame 410 and in the lower part to the rail for trapezoidal metal roof 450, the universal clamp assembly 100 in the mid-clamp mode 300 holds (in the center) the solar panels 420.

Although the invention has been described and illustrated with specific illustrative embodiments, it is not intended that the invention be limited to those illustrative embodiments. Those skilled in the art will recognize that variations and modifications can be made without departing from the spirit of the invention. Therefore, it is intended to include within the invention, all such variations and departures that fall within the scope of the appended claims and equivalents thereof.

| LIST OF REFERENCE NUMERALS | |
|---|---|
| Reference Numeral | Element Name |
| 100 | Universal Clamp Assembly |
| 105 | Securing Member |
| 110 | Securing Means |
| 113a, 113b | First edge, second edge |
| 115 | First channel |
| 117 | Top surface |
| 119 | Bottom surface |
| 121 | First end |
| 123 | Second end |
| 120 | Second channel |
| 125 | First securing hole |
| 130 | At least one first pin |
| 135 | Protruding Structure |
| 140 | Grooved wall |
| 145 | Shock absorbing member |
| 150 | Support Structure |
| 155a, 155b | First lateral wall, second lateral wall |
| 160 | Second securing hole |
| 165a, 165b | First coupling member, second coupling member |
| 170 | At least one notch |
| 175 | At least one first hole |
| 180a, 180b | First ribbed surface, second ribbed surface |
| 185a, 185b | First stabilizing element, second stabilizing element |
| 200 | End-clamp |
| 300 | Mid-clamp |
| 410 | Frame |
| 420 | Solar Panels |
| 430 | Rail |
| 440 | Seam Clamp |
| 450 | Trapezoidal metal roof |

What is claimed is:

1. A universal clamp assembly for clamping a solar panel, comprising:
   a securing means to secure a support structure, the securing means comprising:
   a first channel on a top surface of the securing means;
   a second channel on the top surface across a longitudinal axis from a first end to a second end of the securing means;
   a first securing hole to secure a securing member;
   at least one first hole at a bottom surface of the securing means that receives at least one first pin adapted to avoid anodizing of a frame of the solar panel;
   a protruding structure at the bottom surface of the securing means to prevent rotation of the securing means; and
   a grooved wall extending from the bottom surface to place the securing means with the support structure in a position to prevent sliding;
   the support structure configured to couple with a rail of the solar panel, the support structure comprising:
   a second securing hole to secure the securing member disposed through the first securing hole of the securing means, thereby joining the securing means and the support structure;

a first lateral wall and a second lateral wall to provide suitable positioning to the securing means on the support structure; and a first coupling member and a second coupling member to secure the universal clamp assembly in the rail; and a shock absorbing member disposed between the securing means and the support structure to keep the securing means in place during installation.

2. The universal clamp assembly of claim 1 wherein the support structure has a first stabilizing element and a second stabilizing element opposite to each other to stabilize the securing member when having contact with the first stabilizing element and the second stabilizing element.

3. The universal clamp assembly of claim 2 wherein the first stabilizing element and the second stabilizing element are trapezoidal shaped.

4. The universal clamp assembly of claim 1 wherein the support structure is made of a metal.

5. The universal clamp assembly of claim 1 wherein the support structure is made of steel.

6. The universal clamp assembly of claim 1 wherein the securing means is made of a metal.

7. The universal clamp assembly of claim 1 wherein the securing means is made of aluminum.

8. The universal clamp assembly of claim 1 wherein the securing means is coupled with a frame of the solar panel.

9. The universal clamp assembly of claim 1 wherein the securing means has a first edge and a second edge each beveled from top to bottom.

10. The universal clamp assembly of claim 1 wherein the first coupling member and the second coupling member comprise at least one notch adapted to avoid anodizing on the rail that supports the solar panel.

11. The universal clamp assembly of claim 1 wherein the first coupling member and the second coupling member are U-shaped.

12. The universal clamp assembly of claim 1 is a two-piece assembly.

13. The universal clamp assembly of claim 1 wherein the protruding structure is adapted to prevent the rotation of the securing means while tightening the securing member.

14. The universal clamp assembly of claim 1 wherein the securing member is at least one of a bolt, a flanged bolt, a threaded drive bolt and a rivet.

15. The universal clamp assembly of claim 1 wherein the first lateral wall and the second lateral wall have a first ribbed surface and a second ribbed surface respectively for suitable positioning of the securing means on the support structure.

16. The universal clamp assembly of claim 1 wherein the at least one first pin is made of at least one of: aluminum and non-ferrous element.

* * * * *